M. W. KAYE.
METHOD OF MANUFACTURING GLASSWARE.
APPLICATION FILED APR. 2, 1909.
952,908.
Patented Mar. 22, 1910.
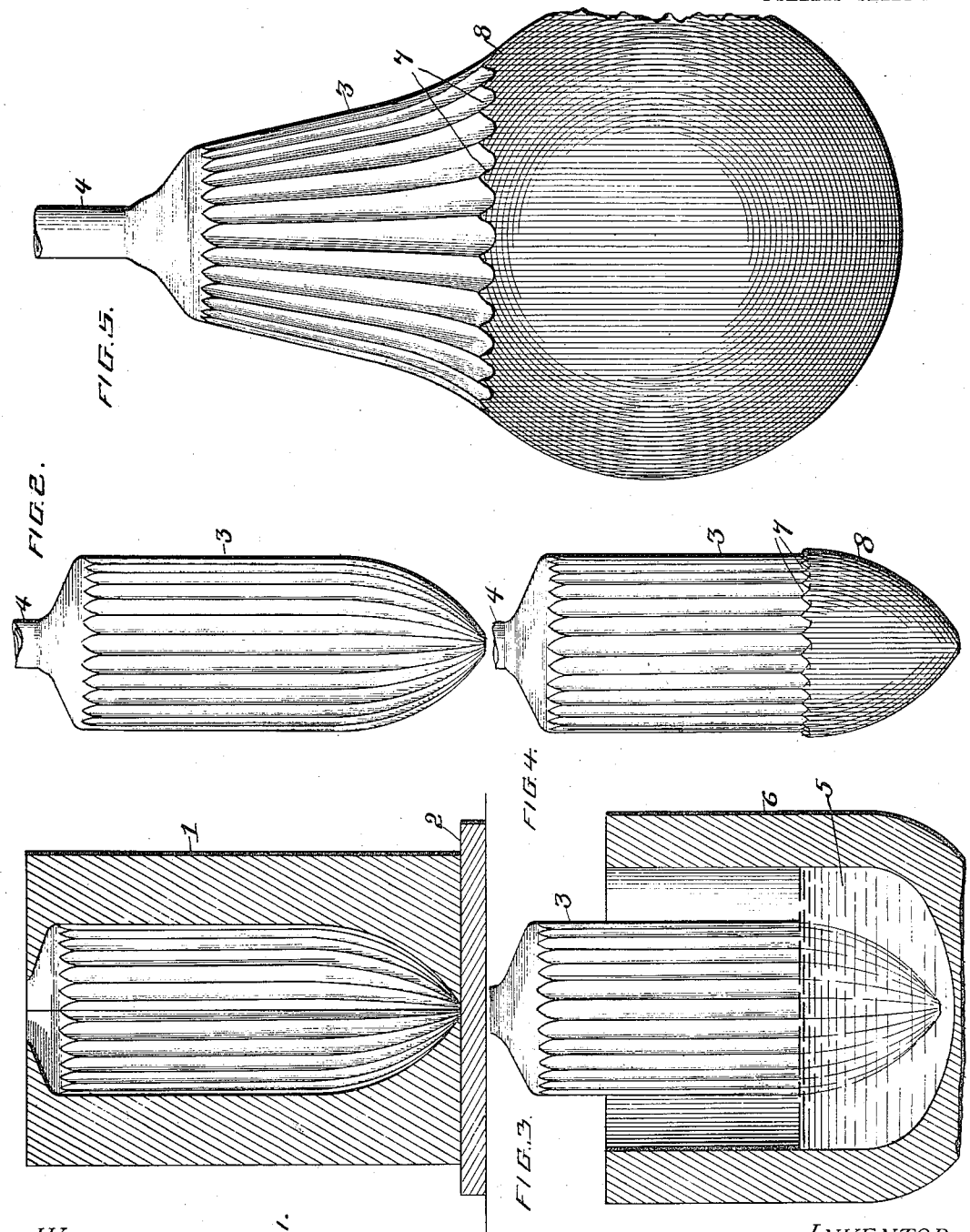

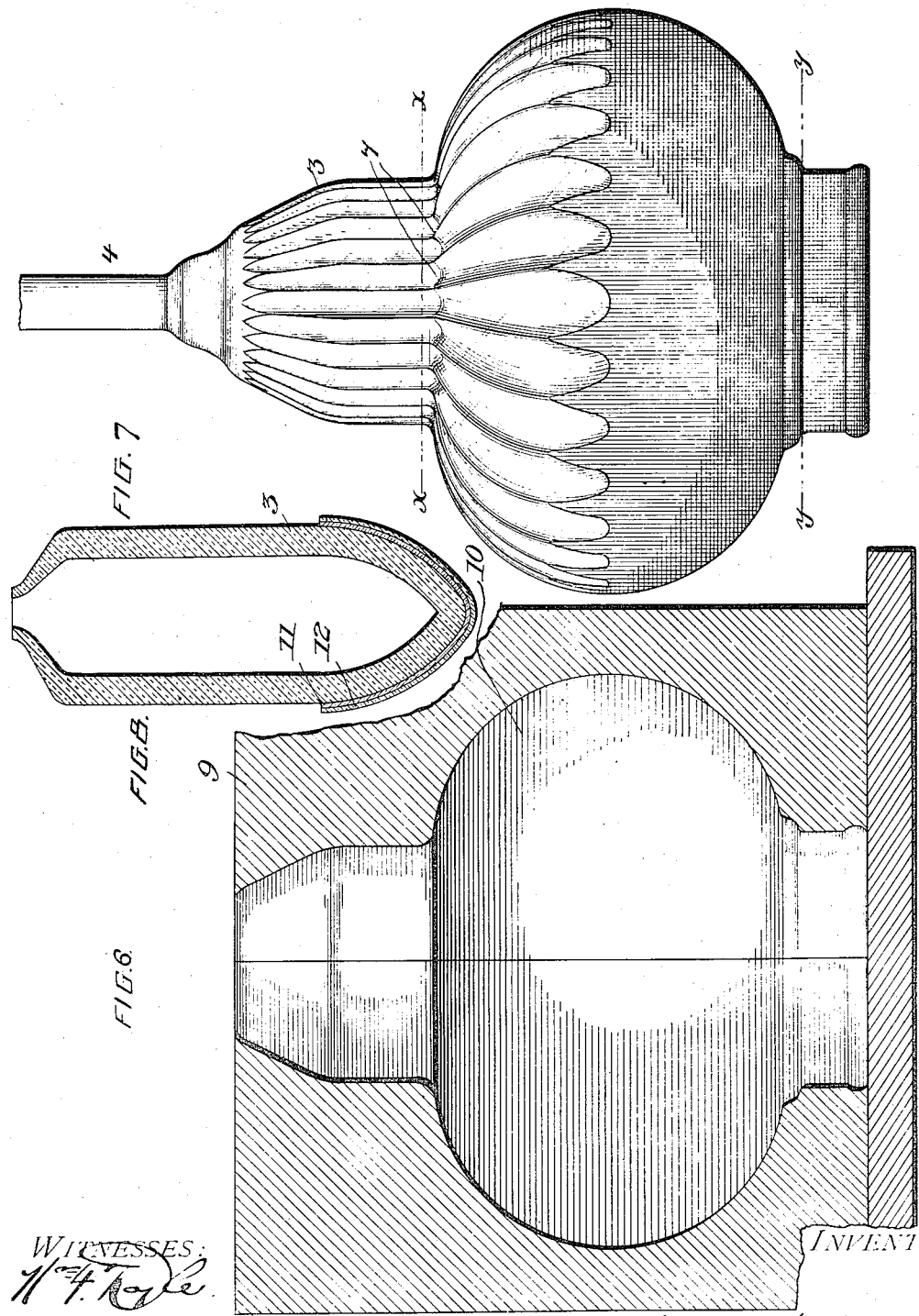

UNITED STATES PATENT OFFICE.

MELVIN W. KAYE, OF MONACA, PENNSYLVANIA, ASSIGNOR TO THE PHOENIX GLASS CO., OF MONACA, PENNSYLVANIA, A CORPORATION OF PENNSYLVANIA.

METHOD OF MANUFACTURING GLASSWARE.

952,908.  Specification of Letters Patent.  Patented Mar. 22, 1910.

Application filed April 2, 1909. Serial No. 487,454.

*To all whom it may concern:*

Be it known that I, MELVIN W. KAYE, citizen of the United States, residing at Monaca, in the county of Beaver and State of Pennsylvania, have invented certain new and useful Improvements in Methods of Manufacturing Glassware, of which the following is a specification.

This invention has relation to methods of manufacturing hollow glassware, and has for its object the provision of a novel method of manufacturing hollow articles of glass having one portion of the article different in certain characteristics, such as color or transparency or both from another portion of the article.

My invention may be employed in the manufacture of a very large variety of articles, and as an example of an article of well known form which can be produced by my improved method of manufacture, I will specifically describe the method as employed in manufacturing globes for gas lights.

In carrying my method into effect, I gather a quantity of glass on a blow pipe or punty and after the usual manipulation I place the mass of glass so gathered in a pattern mold of suitable internal configuration and blow or press a blank. This blank is then removed from the mold and its lower end dipped into a pot or tank or ladle or other container of molten glass of a color or of a transparent quality different from that of the blank, care being taken to maintain the blank in a vertical position while it is being dipped, so that the molten glass which adheres to the blank when the latter is dipped therein will adhere on a circular line at right angles to the vertical axis of the blank. The blank is then withdrawn from the container, drawing with it a mass of the molten glass, the depending end thereof being cut off or otherwise separated from the mass of glass in the container. As the blank is withdrawn the adhering glass at its upper edge will assume a form other than a straight line, the edge, when the blank is formed with vertical ribs being composed of a series of regular concave indentations and this configuration will be preserved throughout all of the succeeding steps to the completion of the article. The blank and the adherent mass which now constitutes an integral part of the blank, is now reheated and blown in the open air so as to increase its size and thin its walls, being reheated from time to time as found necessary or expedient and otherwise manipulated in a manner familiar to workers in glass and is finally placed in a paste mold or hot mold and blown to its final size and shape therein.

The article produced as the result of the foregoing method is a hollow glass body a portion of which has a pattern or design in relief on its outer surface while the remaining portion is of a different color or transparent quality or both and is plain on its external surface, the meeting line of the two portions being undulating and dependent for its particular form on the pattern of the mold in which the blank is first formed.

If desired the blank can be successively dipped into two containers and thus coated with glass of two colors one of which will overlie the other in the completed article, whereby additional, attractive, artistic and useful effects can be attained. For instance, the blank can be formed of transparent colorless glass and first dipped in white glass and then in green glass the completed article will then have one portion transparent and the other portion white on the interior and green on the exterior, the white serving as a very effective reflecting surface and the green giving an artistic and attractive color to the outer surface.

Referring to the accompanying drawing illustrating the various steps of the method and the instrumentalities for carrying it into effect, Figure 1 is a vertical sectional view of the mold in which the blank is formed. Fig. 2 is a side elevation of the blank after being formed in the mold shown in Fig. 1. Fig. 3 is a vertical sectional view showing the blank dipped into a mass of molten glass. Fig. 4 is a side elevation of the blank after the dipping operation. Fig. 5 is a side elevation of the blank after being blown in the open air to approximately the proper size for the final blowing. Fig. 6 is a vertical sectional view of a paste or hot mold adapted to receive the blank shown in Fig. 5. Fig. 7 is a side elevation of the article as it comes from the mold shown in Fig. 6, the dotted lines $x$—$x$ and $y$—$y$ indicate where it is to be cut off to form the completed globe ready to be annealed. Fig. 8 is a sectional view of a blank of crystal glass which has been dipped successively into glass of two different colors.

The mold shown in Fig. 1 and designated 1 is of ordinary construction, being a sectional mold with a bottom plate 2, and is formed with a pattern in intaglio on its inner surface, which may be of any desired character, that shown in the drawing being a series of vertically disposed V shaped grooves which will produce the blank 3 shown in Fig. 2 and having on its outer surface a series of V shaped vertical ribs.

The mold shown in Fig. 1 is used in the usual manner, that is to say, a mass of glass is gathered on a blow pipe 4 and marvered and otherwise manipulated in the usual manner and then inserted in the mold and blown up so as to completely fill the mold and impart to the mass of glass the shape and pattern of the cavity of the mold. After having been blown in the mold 1, and after it has hardened sufficiently to retain its shape, the blank 3 is dipped into a mass of molten glass, 5 in a container 6, the glass of the container being of different color or different degree of transparency or both, from that of the glass in the blank, care being taken to hold the blank in a vertical position while it is being dipped so that the surface of the molten glass will be at a right angle to the vertical axis of the blank. The blank is allowed to remain in the molten glass sufficiently long to cause the latter to firmly adhere or weld to the blank and the blank is then raised from the container, a quantity of the molten glass being taken up with the blank. The molten glass taken up on the blank, being soft, will sag down somewhat as it is raised, with the effect that the upper edge of the glass added to the blank by the dipping operation, instead of being straight, as might be supposed, is undulating, its particular form being dependent upon the pattern or design of the surface of the blank and that produced by the pattern of the particular blank illustrated, being a series of regular scallops 7, this formation being maintained throughout the subsequent operations, the scallops however being enlarged proportionately to the enlargement of the blank, without material change of their original form.

The blank with the adherent mass of glass as it is taken from the container is shown in Fig. 4, the adherent mass being designated 8 and being, as before described, of a different color or degree of transparency or both from the blank first formed and which may be called a primary blank and the composite blank thus produced is now blown to larger size and somewhat globular shape in the open air and otherwise manipulated in the usual and well known manner being treated just as if it was a blank composed of a single integral mass which in fact it has become by the spontaneous welding or merging of the molten glass from the container with the primary blank as originally formed.

From time to time and as required the blank is reheated during the blowing operation until finally and when it has acquired the proper size and shape it is inserted in a paste mold or, as it is sometimes called, a hot mold 9, which has a smooth internal surface 10 exactly conformable to the size and shape of the finished article and in this mold the blank is blown to fill the mold cavity, being, preferably, slowly rotated during the blowing operation so as to render the outer surface of the article smooth and finished in appearance. When the blowing operation in the paste mold or hot mold has been accomplished the glass is removed and the end parts cracked off or cut off on the lines $x$—$x$ and $y$—$y$ of Fig. 7, leaving the completed article ready for the leer or annealing oven.

While it is preferable to produce the final shape of the article by blowing it in a paste mold it is possible to employ a mold of ordinary character having a smooth internal surface and to dispense with the twisting operation and indeed, if desired, the blowing of the article to completed shape may be accomplished without using a finishing mold, the final formation being accomplished wholly by blowing in the open air and proper and skillful manipulation in the usual manner during such blowing operation.

In Fig. 8 I have shown a blank of crystal glass which has been formed in the mold shown in Fig. 1 and then dipped successively into two masses of molten glass of different color, so as to acquire two coatings 11, 12, overlying one another and both overlying the lower part of the transparent glass. The blank shown in Fig. 8 is, after having been dipped as above stated into molten glass of two different colors, treated in the same manner as the blank shown in Fig. 4, the completed article however having one portion transparent and the other portion of one color inside and of another color outside, as will be readily understood by those skilled in the art.

I claim:

1. The method of manufacturing hollow glassware, consisting in blowing a blank in a mold having an internal pattern, then dipping the blank in molten glass of different color from that of the blank, then withdrawing the blank from the molten glass together with an adherent mass of such molten glass and thereby forming an undulating edge on the added glass, then blowing the blank and the adherent mass in the open air and then imparting the final shape to the glass by blowing and twisting it in a paste mold, or hot mold.

2. The method of manufacturing hollow glassware, consisting in forming a blank with an external raised pattern or design, then dipping the blank into a mass of soft glass, then removing the blank with an adherent mass of such soft glass and then blowing the blank to increased size in the open air and finally blowing the blank to completed size and form in a suitable mold.

3. The method of manufacturing hollow glassware, consisting in forming a blank with an external raised pattern, dipping said blank into molten glass, removing the blank with an adherent quantity of the molten glass and then blowing the blank to required size and form.

4. The method of manufacturing hollow glassware consisting in dipping a blank with an external pattern into a mass of molten glass, then withdrawing the blank with an adherent portion of said molten glass, thereby forming a composite blank with an undulating juncture line and then blowing such composite blank to completed form.

5. The method of manufacturing glassware, consisting in forming a primary blank with an external pattern in relief, then dipping said primary blank into molten glass of different character from that of the primary blank, then withdrawing the primary blank with an adherent quantity of such molten glass thereby forming a composite blank and finally shaping the composite blank to completed form.

In testimony whereof I affix my signature, in presence of two witnesses.

MELVIN W. KAYE.

Witnesses:
CHARLES Z. FOGEL,
GEO. R. JACKSON.